A. J. MOXHAM.
ORE SEPARATING PROCESS.
APPLICATION FILED FEB. 24, 1912.
1,294,519.
Patented Feb. 18, 1919.
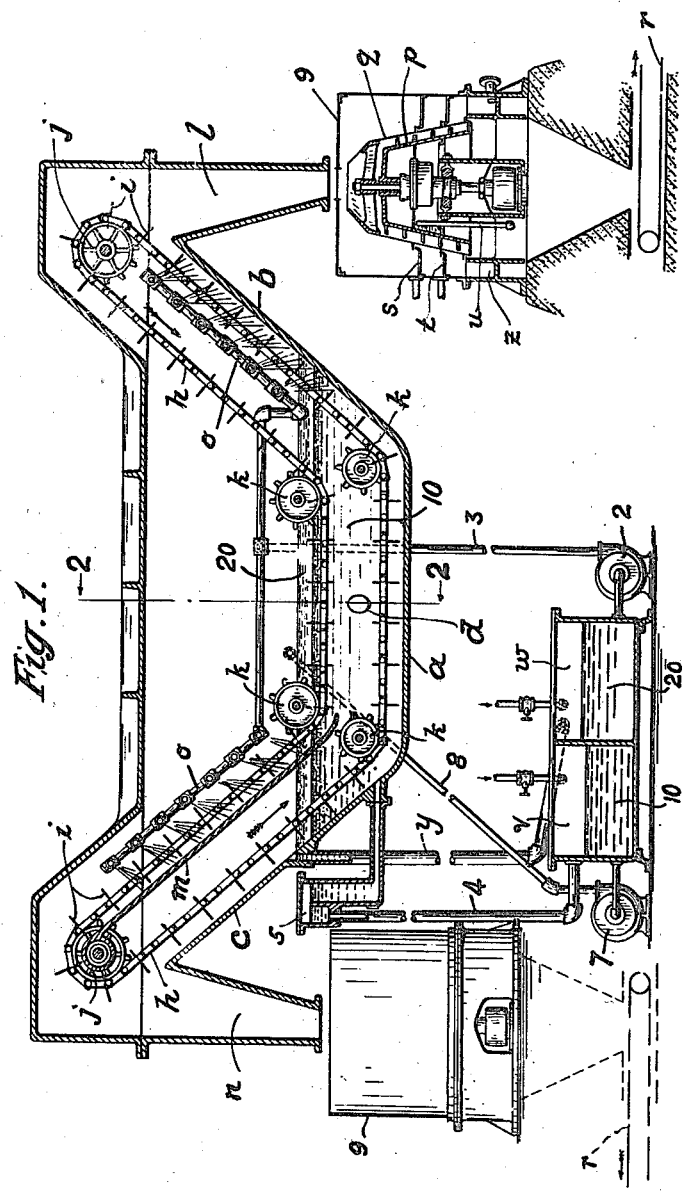
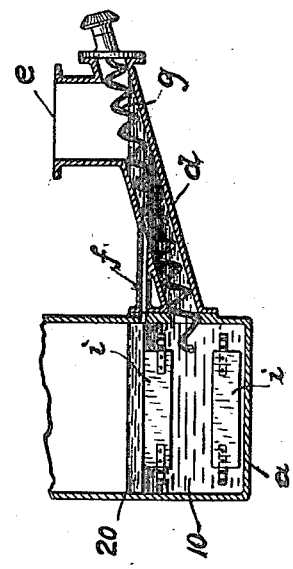
WITNESSES:—
Rob R Mitchel.
E. E. Wall
INVENTOR
Arthur J. Moxham
BY
Frank S. Busser
ATTORNEYS.

UNITED STATES PATENT OFFICE.

ARTHUR J. MOXHAM, OF WILMINGTON, DELAWARE.

ORE-SEPARATING PROCESS.

1,294,519. Specification of Letters Patent. Patented Feb. 18, 1919.

Application filed February 24, 1912. Serial No. 679,635.

*To all whom it may concern:*

Be it known that I, ARTHUR J. MOXHAM, a subject of the King of Great Britain, residing at Wilmington, county of New Castle, and State of Delaware, have invented a new and useful Improvement in Ore-Separating Processes, of which the following is a full, clear, and exact description, reference being had to the accompanying drawings, which form a part of this specification.

The object of my invention is to render economically feasible the separation of solids of different specific gravities—as for example, the iron and silicious material of iron ore—by means of a heavy liquid either used in the place of water by means of the ordinary jigs, or used to effect the separation in such cases as those in which the specific gravity of the liquid is between that of the ingredients to be separated. Such a liquid is of necessity expensive, and the main object of the invention is to avoid waste of the liquid and with that end in view to minimize the amount of the separating liquids that adheres to the removed separated solids and to recover such separating liquid as is carried off by the removed solids with the greatest possible economy and thoroughness.

My complete process comprises a number of steps all of which are not absolutely essential to the approximate attainment of the main object of my invention, but all of which contribute to that end in greater or less degree. While therefore, my complete process may be said to comprise the steps enumerated in the following paragraphs, it will be understood that my invention, in its broader aspect, does not require the employment of all the steps enumerated, the essential features of the process being pointed out in the claims.

According to my complete process, the solids to be separated, which, for example, may be assumed to be the constituents of iron ore, are first coated with a liquid of different specific gravity from the liquid intended to be used for separation. The washing liquid must be a cheap liquid that is not miscible with the heavy liquid and that is also a neutral liquid—that is, one which will not chemically react with the separating liquid. The requirement of cheapness will also involve the employment of a liquid that is not only of less specific gravity than the separating liquid but is also of less specific gravity than the lighter of the two solid constituents. An example of a liquid meeting the necessary requirements, especially when iron ore is to be separated, and when it is used in connection with the particular dense separating liquid hereinafter named, is either manganese bromid, zinc bromid or phosphoric acid. In some cases even water can be used as the preliminary solution with which to coat the ore and in addition a very large number of solutions made of the various salts or other reagents.

The solids when coated are conveyed beneath the surface of a body of separating liquid of mediate specific gravity. A liquid available for this purpose is arsenious bromid. The separating tank containing the body of the heavier liquid also contains a body of the lighter liquid with which the solids have been preliminarily coated and which floats in the form of a blanket on the top of the heavier liquid.

Upon immersion in the heavier liquid, the lighter solids rise to the surface thereof and float there under the blanket liquid, while the heavier solids sink. The two differently spaced layers of solids are then mechanically separately lifted through the superincumbent blanket of lighter liquid to above the upper level thereof.

In the withdrawal of the solids through the blanket of lighter liquid, a certain proportion of the heavier and denser liquid is washed off and sinks by gravity into the underlying body of dense liquid. After the solids are elevated above the composite liquid body, as described, and during their passage to the exits from the separating tank, they are sprayed with additional quantities of the lighter liquid for the purpose of removing a substantial additional proportion of the adherent dense liquid.

When the separated solids emerge from the separating tank, they are each subjected to the action of centrifugal force in a manner, well known in the art, that will be effective to drive off the greater part of the liquid adhering to the solids. This operation, however, will not, for reasons that will be presently stated, completely dry the material; but by reason of the previous steps in the process, will be effective to eliminate substantially all of the heavier expensive liquid that it is desired to save, leaving behind principally, if not entirely, the liquid with which the mineral is coated, the reason for which will be plain from the following explanation.

It is well known that the surface of a mineral has an attraction, in varying degrees, for all liquids. In the separation of iron ore, the main ingredient to be eliminated is the silicious material; the material to be saved is the ore or oxid of iron. Both of these materials have a surface attraction for any liquid, although the iron ore has a greater attraction for liquids generally than the silica. It is found that in the continuous centrifugal action all but the last traces of the liquid are eliminated and saved, as will be explained hereinafter, but when it comes to this last trace of liquid that is adhering to the surface of the material, whether silica or oxid of iron, the attraction between the liquid and the mineral, tending to hold the liquid against and in contact with the mineral, is found to be greater than the power of any reasonable centrifugal force to drive it away from the mineral. Hence by coating this mineral with a cheap solution, which is effected in the preliminary step of the process, the film of liquid that resists elimination in the continuous centrifuge is composed practically entirely of the cheap solution, the value of which is so nearly negligible that it becomes an item of practically no cost, whereas if the film of persistently adherent liquid consisted of the heavier liquid, the value of the same would be so great as to constitute an item of great cost.

To illustrate, let us assume that the amount adhering to the separated ore constituents is in either case from 1½% to 2% of the weight of the mineral. The cost of heavy specific gravity solution will run from eight cents to twelve cents per pound. At a glance it is seen that the loss of 2% of this costly material would render the process so expensive as to make it prohibitive. On the other hand, the cost of the lighter solutions named and of many of the other available solutions is so low that the loss is immaterial compared with the great gain of an efficient separation.

In the description hereinafter set forth of the drawings and of the means therein shown for carrying out my new process, additional explanations will be given of the reasons why the centrifugal action above mentioned will be effective to eliminate the last vestige of the more expensive fluid relied upon to effect the separation of the solids.

During the application of centrifugal force, and while the material is passing through the continuous centrifuge, it is advantageous to spray the same with a liquid for the purpose of diluting the adherent liquid carried by the solids as they emerge from the separating tank, and thereby insure still further the elimination of such liquid. The spraying liquid should always be a cheaper material than the liquid that is to be removed. While its action is always mechanical it may in some cases advantageously be chemical also. That is, the spraying material may be a solvent of the liquid left on the solids at the stage of application of the spray and which liquid it is desired to drive off and save. If the liquid at this stage happens to contain any remnant of the heavy separating liquid (for example, arsenious bromid) then concentrated acetic acid can be used as a spray; this acid being a strong solvent of arsenious bromid; and its action will be both chemical (dissolving) and mechanical. If the liquid at this stage is only the lighter liquid, then water may be used as a spray, its action being to mechanically drive off the lighter liquid without any solvent action between them.

To maintain constant the level of both liquids in the separating tank, I allow both liquids to separately overflow into separate reservoirs or settling tanks, and continuously pump the liquids from their respective reservoirs back to the separating tank; or, less desirably, they may both be pumped into the same reservoir, in which, as in the separating tank, the lighter liquid will float, as a separate body, upon the surface of the body of heavier liquid. In pumping the blanket liquid from its reservoir, the solution is delivered into such portion of the tank, and in such a manner, that it will spray the solids after they have emerged from the composite separating liquid and on their way to their respective exits, as and for the purpose hereinbefore described.

It may happen, under certain conditions, that a certain small amount of the separating liquid may be mechanically combined in minute particles with the lighter blanket liquid, in the form of an emulsion. Such mechanically combined particles will sooner or later be carried by the overflow into the reservoir for the lighter liquid. If the separating liquid used is arsenious bromid, slightly cooling this reservoir will cause the particles of arsenious bromid to crystallize, and by the increase of density thus secured, the equilibrium whereby it was carried will be disturbed and the crystals will sink to the bottom. They will thus be separated from the blanket liquid and can be removed from time to time. In the case of arsenious bromid, the point between crystallization and solution is 31° C. Many of the other heavy liquids also crystallize at a temperature very near to normal. It will therefore be understood that the two liquids, in addition to the other qualities hereinbefore named, should preferably have also the following qualities: One liquid (say the heavier liquid) should be crystallizable at a temperature below that at which the separation is effected. The other liquid (say the lighter blanket liquid) should be non-crystallizable, or crystallizable at a temperature either above or below that at which the heavier liquid is crystallizable. Of course, if the lighter liquid is the one that crystallizes at the higher temperature, the cooling operation will be employed to effect the crystallization of the lighter liquid. The term crystallization is intended to indicate that form of solidification comprising a large number of small and separate units that form around their own nuclei and in so forming largely eliminate the presence of extraneous matter, as distinguished from that form of solidification in which a body of relatively large cubical content is formed which embodies within it matter associated with it when in a liquid condition.

It also sometimes occurs that during the vigorous action of the sprays which wash the separated solids in the separator, the liquids unite to form an emulsion or mix to a degree which, while scarcely constituting a true emulsion, produces a more or less imperfect mixture which if not corrected would obstruct the separating action. When such an emulsion or mixture is formed, its subsequent clarifying is rapid. It generally clears up and separates easily on coming to rest in the separator. If not entirely cleared up, however, the emulsion or mixture will be carried out of the separating tank with the overflow, and there is then ample time for the elimination of the emulsion or mixture by the settling of the heavy liquid in the bottom of the reservoir for the lighter liquid. The liquid that is pumped therefrom should, therefore, be withdrawn from above the bottom portion of the reservoir, at which point the arsenious bromid will be collected, either in a crystalline or non-crystalline condition, according to whether the ordinary temperature is used or whether the reservoir is slightly cooled for the purpose of crystallizing the heavy liquid.

While the initial coating of the solids in a lighter liquid, the separation of the solids in a heavier liquid upon the surface of which a body of the lighter liquid floats, and the subsequent spraying of the separated solids with the lighter liquid, are all highly important features of my invention, they are not absolutely indispensible, for the reason that the solids may be separated in a single fluid and reliance may be had solely upon the centrifugal action, supplemented by spraying, to effect the complete removal and saving of the separating liquid.

For example, centrifugal action alone will eliminate all but a very small percentage of the adherent costly liquid. If the solids in the centrifuge be sprayed with concentrated acetic acid, or any other suitable solvent, the combined effect of the mechanical and solvent action will be to reduce the percentage of adherent separating fluid to merely a trace. If the solids be then sprayed with water (principally for the purpose of eliminating and saving the acetic acid now adhering to the material), the percentage of separating fluid ultimately adherent to the solids will be incalculably small.

The acetic acid used to drive off the heavy solution or the water used to drive off the acetic acid would be saved and either re-used subsequently for spraying until the amount of the liquid absorbed was considerable, when it would be concentrated again by driving off and saving the heavy solution by either distillation or crystallization, or else if acetic acid and water, it would be at once concentrated by heat, according to which procedure would be the more economical one under the conditions that might arise.

Having described the manner in which my improved process is practised, I will now describe an apparatus suitable for carrying out such process. Such an apparatus is shown in the accompanying drawings, in which—

Figure 1 is an elevation, mostly in section, of the apparatus. Fig. 2 is a sectional view showing the means for conveying the solids to the separating tank. Fig. 3 is an enlarged sectional diagram illustrating the condition in which a solid particle emerges from the separator.

While the apparatus illustrated possesses certain features of novelty that will be made the basis of another application for patent to be hereinafter filed, I do not claim herein any details or arrangements of mechanism. The invention claimed herein is confined to the process, which may be carried out by any other apparatus that may be adapted from known machines or that may be specially devised for the purpose.

The separating tank comprises the central horizontal portion $a$ and the inclined end wings $b$ and $c$. 10 represents the heavy liquid and 20 represents the lighter blanket liquid.

$d$ is an inclined feed tube having an opening $e$ into which the ore or other material to be separated is fed. The lower end of the feed tube $d$ communicates with the separator tank below the level of the heavier liquid 10. The upper end of the feed tube $d$ extends above the level of the lighter liquid 20. $f$ is a horizontal pipe connecting the separator tank and feed tube and located at such a level that its lower part carries the heavier fluid and its upper part the lighter fluid. Thus the upper portion of the feed tube $d$ contains only the lighter fluid. $g$ is a screw conveyer in the feed tube. By this arrangement the material to be separated is well covered with the lighter liquid 20 before it is carried into the heavier liquid 10 in the separator tank. The material is thereby preliminarily washed and coated, for the purpose hereinbefore described.

It is sometimes preferable, however, to coat the mineral to be separated while it is *en route* to the separator in a special and distinct apparatus; for example—an apparatus of similar construction to the well known log washer, or in a revolving barrel.

After emerging from the feed tube and immersion in the heavier liquid 10, the lighter solid ingredients rise to the surface thereof and float there under the blanket liquid, while the heavier solid ingredients sink.

In the tank $a$—$b$—$c$ is the endless conveyer consisting of sprocket chains $h$ and flights $i$ formed of rectangular plates. This conveyer, like the tank, has a central portion and end inclined portions. At opposite ends of the tank, the conveyer chains $h$ pass around sprocket wheels $j$, $j$, one of which is a driving wheel. $k$, $k$, etc., are idler or guiding sprockets. The locations of the wheels $k$ are such that in the central portion $a$ of the tank, the upper reach of the conveyer is at the upper level of the heavier liquid 10, while the lower reach of the conveyer is at the lower level of the heavier liquid 10. The conveyer travels in the direction of the arrow at a slow speed.

The lower reach of the conveyer, by means of the flights $i$, catches the heavier solids, drawing them up the incline $b$ and discharging them through the opening $l$. The flights $i$ of the upper reach of the conveyer catch the lighter solids and carry them up the incline $m$ and dicharge them through the opening $n$.

On their way from the body of liquid to their respective discharge openings, the solids are washed by spraying devices arranged along the spray pipes $o$, through which the lighter liquid is pumped as hereinafter described. By this means, much of the adherent heavier fluid is expelled from the solids before they leave the separating tank.

From the openings $l$ and $n$, the separated solids drop into two continuous centrifuges 9 which may be of any type known in the art. At the right hand side of Fig. 1, where one of these centrifuges is shown in section, the same is shown as consisting of an outer perforated basket $q$, capable of revolving at high speed to induce the necessary centrifugal force to throw off the liquid, and an inner basket $p$ which is provided with a spiral feed on the outside for the purpose of carrying the material down continuously. The inner basket may either remain stationary or may revolve at such a differential speed as will effect the delivery of the material into the opening below the centrifuge. $r$, $r$, represent conveying belts adapted to receive the dried materials discharged from the centrifuges and to convey the same to any desired point of delivery.

As hereinbefore stated, the solids come to the centrifuge with the particles coated with a film of the lighter liquid directly in contact with the surface of the solid, and a superficial covering of the heavier liquid, the elimination of which by the action of the centrifuge is desired. It has already been explained why, under these conditions, the action of the centrifuge will be to throw off practically all the heavier liquid. The following explanation will still more clearly show why such action occurs. In Fig. 3, 30 represents the mineral, 20 the film of light blanket solution adhering around the surface, and 10 the additional film of heavy solution. On reaching the continuous centrifuge, the centrifugal force tends to throw the solutions 20 and 10 away from the surface of the ore 30. But whereas the attraction between the light liquid 20 and the ore 30, that has been described, causes a small quantity of it to adhere to the ore, the tension between the surface of the liquid 10 in contact with the liquid 20 is so light that the centrifugal force entirely overcomes this tension and therefore is able to eliminate the last vestige of the expensive liquid 10. The adhesion of liquid 10 to the mineral 30 is measured by what may be called the surface tension between the two liquids 10 and 20, whereas the adhesion of the last trace of liquid 20 to the mineral is governed by the surface attraction of the mineral for the liquid 20 and is too great to be entirely overcome.

When the material is acted upon by the upper portion of the centrifuge, the heavy liquid is eliminated, and as this liquid is thrown out it is caught upon a tray $s$. As the material continues to feed downward it comes into contact with a spray from the pipe $u$, which, as hereinbefore stated, dilutes the adherent liquid and facilitates its complete elimination.

It will be noticed that the liquid from this portion is caught by another trough $t$. A number of these troughs can be used according to the size of the centrifuge and the liquid used for washing the material. Any liquid left in after the material has passed the zone of the spray is caught in the trough $z$. By the above means the different liquids used and saved can be kept separate, notwithstanding the fact that the centrifuge is continuous, and, as before stated, the liquid used may be either a solvent of the liquid which is to be recovered (in which case the dilution is chemical as well as mechanical), or else it may be one which is not a solvent (in which case the washing or dilution is mechanical only).

*v* and *w* represent two reservoirs or settling tanks; one, *v* for the heavier liquid, the other, *w*, for the lighter liquid. *y* is an overflow pipe communicating at its lower end with the reservoir *w* and at its upper end with the interior of the tank at the upper level of the lighter fluid. 2 is a pump which draws off the lighter liquid from the reservoir *w* at a point above the bottom thereof, and forces the same, through pipe 3 into the spray pipes *o*, whence the liquid is sprayed upon the emerging separated solids, as hereinbefore described.

4 is an overflow pipe communicating at its lower end with the interior of the tank below the lower level of the heavier liquid, there being an intermediate goose-neck 5 having a partition whose upper edge is in horizontal alinement with the upper level of the heavier liquid. 7 is a pump which draws off the heavier liquid from the reservoir *v* and forces the same, through pipe 8, into the separating tank. By the means described, the level of both fluids is maintained constant by a continuous overflow from each.

Having now fully described my invention, what I claim and desire to protect by Letters Patent is:

1. The process of separating solids of different specific gravities, which consists in preliminarily coating the same with a relatively light liquid, then conveying such solids to a liquid body composed of a body of said liquid superimposed upon a body of relatively dense liquid, of a specific gravity between the specific gravities of the coated solids to be separated, and then separately removing the solids that float and those that sink, said lighter liquid being one adapted to remain on the particles in the denser liquid and weaken the bond between the particles and the denser liquid.

2. The process of separating solids of different specific gravities, which consists in providing a separating medium comprising a relatively dense liquid of a specific gravity between the specific gravities of the solids to be separated, underneath a relatively lighter or blanket liquid and in introducing the solids to be separated by first carrying them through, and thoroughly admixing them with, the blanket fluid in order to preliminarily coat the solids therewith, said blanket liquid being adapted to remain in the particles in the heavier liquid and weaken the bond between the particles and the heavier liquid.

3. The process of separating solids of different specific gravities, which consists in immersing the same in a liquid body composed of a relatively heavy liquid and a relatively light liquid superimposed thereon, said lighter liquid adapted to remain on the particles when immersed in the heavier liquid and weaken the bond between the particles and the heavier liquid, and then lifting the separated solids above the level of the liquid body and washing the same with the lighter liquid.

4. The process of separating solids of different specific gravities, which consists in preliminarily coating the same with a relatively light liquid, then conveying such solids coated with the lighter liquid to a liquid body composed of a relatively heavy liquid and a relatively light blanket liquid superimposed thereon, the lighter liquid being one adapted to remain on the particles in the heavier liquid and weaken the bond between the particles and the heavier liquid, and then removing any denser liquid that adheres to the separated solids.

5. In the process of separating solids of different specific gravities by means of a separating liquid, applying to the solids a coating of another material intervening between the solids and the separating liquid, effecting the separation of the coated solids in said separating liquid, and then removing the solids and severing the bond of union between the coating material and the separating liquid and driving off the latter.

6. The process of separating solids of different specific gravities, which consists in coating the same with a relatively light liquid, conveying the coated solids beneath the surface of a body of denser liquid of a specific gravity greater than that of the coated solids to be separated, the lighter liquid being one adapted to remain on the particles in the denser liquid and weaken the bond between the particles and the denser liquid, and separately removing the solids which sink and those which rise in the denser liquid, and removing any denser liquid that adheres to the separated solids.

7. The process of separating solids of different specific gravities, which consists in coating them with a relatively light liquid and effecting their separation by means of another relatively heavy liquid of a mediate specific gravity relatively to the specific gravities of the coated solids and separately removing the separated solids that float and those that sink, said lighter liquid being one adapted to remain on the particles in the heavier liquid and weaken the bond between the particles and the heavier liquid.

8. The process of separating solids of different specific gravities. which consists in coating the same with one liquid, effecting their separation in another liquid, said coating liquid being one adapted to remain on the particles in the separating liquid and weaken the bond between the particles and the separating liquid, separately removing the solids that sink and those that float, and subjecting the removed solids to the action of mechanical force adapted to sever the bond of union between the coating liquid and the separating liquid, whereby the latter liquid may be saved for re-use.

9. The process of separating solids of different specific gravities, which consists in coating the solids with a liquid, effecting the separation of the coated solids in another liquid, the first liquid being adapted to remain on the particles in the separating liquid and weaken the bond between the particles and the separating liquid, separately removing the separated solids, and driving off the adherent separating liquid from both the separated solids so that the same may be saved for reuse.

10. The process of separating solids of different specific gravities, which consists in coating the solids with a liquid, effecting the separating of the coated solids in another liquid, the first liquid being adapted to remain on the particles in the separating liquid and weaken the bond between the particles and the separating liquid, removing the separated solids therefrom and washing them with the first liquid for the purpose of diluting and driving off the larger part of the separating liquid adherent thereto, and then subjecting the solids to the action of mechanical force for the purpose of removing from the solids the remainder of the separating liquid.

11. In the process of separating solids of different specific gravities by means of a liquid of a density between that of the two solid constituents to be separated, treating the solids, both before and after separation, with another liquid of less density than the lighter of the two solid constituents, the last named liquid being one adapted to remain on the particles in the separating liquid and weaken the bond between the particles and the separating liquid.

12. The process of separating solids of different specific gravities, which consists in preliminarily coating the same with a relatively light liquid, conveying such solids to a liquid body composed of a body of relatively dense liquid and a superimposed blanket of said relatively light liquid, then, before removal of the separated solids, lifting them above the level of the liquid body and washing the same with the said relatively light liquid, and then removing the solids and subjecting the solids to the action of centrifugal force of such power as to sever the bond of union between the coating liquid and the superficial adherent denser liquid and thus effecting the elimination of the latter.

13. The process of separating solids of different specific gravities, which consists in coating the same with a relatively light liquid, effecting their separation in a liquid body composed of a relatively heavy liquid and a superimposed blanket composed of said relatively light liquid, said lighter liquid being one adapted to remain on the particles in the heavier liquid and weaken the bond between the particles and the heavier liquid, and then removing the separated solids and subjecting them to the action of centrifugal force for the purpose of driving off substantially all the heavier liquid from the coated solids.

14. The process of separating solids of different specific gravities, which consists in coating them with a relatively light liquid and effecting their separation by means of another relatively heavy liquid and removing the separated solids and then mechanically separating the solids and their adherent liquids, said lighter liquid being one adapted to remain on the particles in the heavier liquid and weaken the bond between the particles and the heavier liquid, whereby the relatively heavy separating fluid will be substantially completely driven off and the film of liquid resisting disunion from the surface of the solids will consist substantially entirely of the relatively light liquid.

15. The process of separating solids of different gravities, which consists in coating them with a relatively light liquid and effecting their separation by means of another relatively heavy liquid and removing the separated solids, said lighter liquid being one adapted to remain on the particles in the heavier liquid and weaken the bond between the particles and the heavier liquid, and then subjecting the solids to the action of centrifugal force of such power as to sever the bond of union between the coating liquid and the denser separating liquid, whereby the latter will be driven off and the great bulk of whatever fluid may be retained by the surface tension of the solids will be the lighter fluid only.

16. The process of separating solids of different specific gravities which consists in effecting their separation in a liquid body composed of a body of relatively dense liquid and a superposed blanket of lighter liquid, removing the separated solids therefrom and washing them with the said lighter liquid for the purpose of diluting and driving off the larger part of the separating liquid adherent thereto and allowing the washing liquid and the separating liquid so driven off to return to the said liquid body, and then eliminating from the solids the remainder of the separating liquid adherent thereto.

17. The process of separating solids of different specific gravities, which consists in preliminarily coating the same with a relatively light liquid, then conveying such solids coated with the lighter liquid to a liquid body composed of a relatively heavy liquid and a relatively light blanket liquid superimposed thereon, then immersing the coated solids beneath the level of the heavier liquid, and mechanically lifting the separated solids through and above the lighter blanket liquid and washing such solids with the lighter liquids.

18. The process of separating solids of different specific gravities, which consists in conveying the same to a liquid body composed of a relatively heavy liquid and a relatively light blanket liquid superimposed thereon and immersing the same therein beneath the level of the heavier liquid whereby the heavier constituents will sink and the lighter constituents rise and float upon the heavier liquid, then mechanically lifting the separated solids through and above the lighter blanket liquid and washing such solids with such lighter liquid and allowing the latter to return to the liquid body.

19. The process of separating liquids of different specific gravities, which consists in coating the solids with a relatively light liquid, effecting their separation in a liquid body composed of a body of relatively heavy liquid and a body of said relatively light liquid superimposed thereon, lifting the separated solids above the level of the liquid body in which the separation is effected, spraying the separated solids so lifted with the lighter liquid and allowing the sprayed liquid together with the separating liquid carried off by the spray to reënter the said liquid body, and subjecting the sprayed and withdrawn solids to the action of centrifugal force to eliminate the greater part of any liquid adherent thereto.

20. The process of separating solids of different specific gravities, which consists in coating the solids with one liquid, effecting their separation in a liquid which is not a solvent of either of the solids, then removing the separated solids, coated with said liquids, and subjecting each of the solids to the action of centrifugal force and to the mechanical action of a third liquid which is a solvent of one of the other liquids, thereby insuring a substantially complete elimination from both the separated solids of the liquid or liquids which it is desired to save.

21. The process of separating solids of different specific gravities, which consists in effecting their separation in a liquid which is not a solvent of either of the solids, then removing the separating solids, coated with the separating liquid, and washing each of them in another liquid which is not a solvent of the separating liquid to effect a partial removal of the separating liquid, and then subjecting each of the solids to the action of centrifugal force and simultaneously therewith to the mechanical action of a third liquid which is a solvent of the separating liquid, thereby eliminating from the solids the remainder of the separating liquid.

22. The process of separating solids of different specific gravities, which consists in coating them with a relatively light liquid and effecting their separation by means of another relatively heavy liquid, said lighter liquid being one adapted to remain on the particles in the heavier liquid and weaken the bond between the particles and the heavier liquid, then removing the separated solids and subjecting them to the action of centrifugal force to effect the elimination of a substantial part of the adherent liquid and subjecting the solids, while the centrifugal force is operative, to the mechanical action of a dilutent liquid for the purpose of insuring the maximum elimination from the solids of the adherent liquid.

23. The process of separating solids of different specific gravities, which consists in coating them with a relatively light liquid and effecting their separation by means of another relatively heavy liquid, said lighter liquid being one adapted to remain on the particles in the heavier liquid and weaken the bond between the particles and the heavier liquid, then removing the separated solids and subjecting them to the action of centrifugal force to effect the elimination of a substantial part of the adherent liquid, and subjecting the solids, while the centrifugal force is operative, to the mechanical action of a liquid which is a solvent of the liquid remaining on the ore and which it is desired to drive off and save.

24. The process of separating liquids of different specific gravities, which consists in coating the solids with a relatively light liquid, effecting their separation in a liquid body composed of a body of relatively heavy liquid and a body of said relatively light liquid superimposed thereon, said lighter liquid being one adapted to remain on the particles in the heavier liquid and weaken the bond between the particles and the heavier liquid, lifting the separated solids above the level of the liquid body in which the separation is effected, spraying the separated solids so lifted with the lighter liquids, subjecting the sprayed and withdrawn solids to the action of centrifugal force, and spraying the solids, while under the action of centrifugal force, to dilute the liquid adherent thereto and thereby render more certain the substantial elimination of all the liquid.

25. The process of separating solids of different specific gravities, which consists in conveying the solids to a liquid separating medium composed of a liquid of relatively high specific gravity and a superimposed blanket of liquid of relatively low specific gravity, withdrawing the separated solids from the separating medium, introducing fresh quantities of the lighter liquid to the body of separating liquid by spraying the withdrawn solids and allowing the sprayed liquid, together with any other liquid adherent to the withdrawn solids that may have been carried off by the spray, to flow into the body of separating liquid.

26. The process of separating solids of different specific gravities which consists in effecting their separation by gravity in one liquid, then removing the separated solids and subjecting each of them to the action of a dilutent liquid which is a solvent of the separating liquid and simultaneously therewith to the action of centrifugal force for the purpose of eliminating from the solids and recovering the separating liquid, and then subjecting the separated solids to the action of a different dilutent liquid for the purpose of eliminating from the solids and recovering the second liquid.

27. The process of separating solids of different specific gravities, which consists in conveying the solids to a liquid separating body composed of a liquid of relatively high specific gravity and a superimposed blanket of liquid of relatively low specific gravity, withdrawing the separated solids from said body of liquid, introducing fresh quantities of the lighter liquid to said body of liquid by spraying the withdrawn solids and allowing the sprayed liquid, together with any other liquid adherent to the withdrawn solids that may have been carried off by the spray, to flow into said body of liquid, allowing the lighter liquid to overflow into a separate body of lighter liquid, allowing any heavier liquid that has been mixed or emulsified with the lighter liquid by the action of the spray to separate by settlement in the said separate body of lighter liquid, and returning the lighter liquid from said separate body of lighter liquid to the body of liquid in which the separation is effected.

28. The process of separating solids of different specific gravities which consists in coating the solids with a liquid and effecting the separation of the coated solids in another liquid, the coating liquid being one adapted to remain on the particles in the separating liquid and weaken the bond between the particles and the separating liquid and one liquid not being crystallizable at the temperature at which the other liquid is crystallizable, whereby the complete elimination of the separating liquid from the separated solids is facilitated while the two liquids that may unite as an emulsion or otherwise mix may be separated by cooling to the point required to crystallize only one of the liquids.

29. The process of separating solids of different specific gravities, which consists in coating the solids with a film of relatively light liquid and effecting the separation of the coated solids in a relatively dense liquid, one liquid not being crystallizable at the same temperature as the other liquid, the coating liquid being one which is adapted to remain on the solids and weaken the bond between the same and the separating liquid, and then eliminating any separating liquid that adheres to the separated solids and reducing the temperature of any mixture of the two liquids that may unite as an emulsion or otherwise mix, to the point required to crystallize only one of the liquids, whereby the separating liquid may be saved for re-use in the separating action.

30. The process of separating solids of different specific gravities, which consists in effecting their separation by means of a relatively heavy dense liquid crystallizable at a given temperature, coating the solids with a film of relatively light liquid which is not crystallizable at the same temperature as the dense liquid, and which is directly adhering to the surface of the solids and therefore interposed between them and the separating liquid, and reducing the temperature of any mixture of the two liquids that may mechanically unite as an emulsion or otherwise mix, to the point required to crystallize only one of the liquids, whereby the separation of the same is effected, and the same rendered capable of re-use in the separating action.

31. The process of separating solids of different specific gravities, which consists in effecting their separation in a liquid separating medium composed of a relatively heavy liquid crystallizable below the temperature at which the separation is effected, and a superimposed blanket of relatively light liquid, not crystallizable at or above said temperature, separately removing the solids that sink and those that float, and causing the particles of the heavier liquid that emulsify or mix with the lighter liquid and resist the action of gravity to crystallize, whereby the two liquids are separated, and reconverting the crystals into a liquid form and re-using the same in the separating action.

32. The process of separating solids of different specific gravities, which consists in effecting their separation in a liquid body composed of a liquid of relatively high specific gravity and a liquid of relatively low specific gravity, one of said liquids not being crystallizable at a temperature at which the other liquid is crystallizable, permitting the lighter liquid to overflow to maintain it at a predetermined level, maintaining a body of the lighter liquid to receive the overflow, and cooling the last named body of lighter liquid to a temperature sufficient to change one of the two liquids to a crystalline form, whereby the two liquids are separated and rendered capable of re-use in the separating action.

33. The process of separating solids of different specific gravities, which consists in effecting their separation in a liquid body composed of a liquid of relatively high specific gravity and a liquid of relatively low specific gravity which is directly adhering to the surface of the solids and therefore interposed between them and the separating liquid, one of said liquids not being crystallizable at a temperature at which the other liquid is crystallizable, permitting the lighter liquid to overflow to maintain it at a predetermined level, maintaining a body of the lighter liquid to receive the overflow, cooling the last named body of lighter liquid to change one of the two liquids to a crystalline form, and transferring the lighter liquid to the main body of liquid in which the separation is effected.

34. The process of separating liquid of different specific gravities, which consists in coating the solids with a relatively light liquid, effecting their separation in a liquid body composed of a body of relatively heavy liquid, not crystallizable at the same temperature as the lighter liquid, and a body of said relatively light liquid superimposed thereon, lifting the separated solids above the level of the liquid body in which the separation is effected, permitting the two liquids to overflow at respectively different levels to maintain constant the level of both liquids, maintaining bodies of both liquids to receive the respective overflows, and cooling the separate body of the lighter liquid to a temperature sufficient to change one of the two liquids present into crystalline form, whereby the two liquids are again separated and rendered capable of re-use in the separating action.

35. The process of separating liquid of different specific gravities, which consists in coating the solids with a relatively light liquid, effecting their separation in a liquid body composed of a body of relatively heavy liquid, not crystallizable at the same temperature as the lighter liquid, and a body of said relatively light liquid superimposed thereon, lifting the separated solids above the level of the liquid body in which the separation is effected, permitting the two liquids to overflow at respectively different levels to maintain constant the level of both liquids, maintaining separate bodies of both liquids to receive the respective overflows, cooling the separate body of the lighter liquid to a temperature sufficient to change one of the two liquids present into crystalline form, thereby separating any particles of the two liquids that may have united or mixed as an emulsion or otherwise, continuously transferring liquid from both of the last named bodies to the main body of liquid in which separation is effected and so transferring the lighter liquid by spraying the separated solids that have been lifted above the level of said main body of liquid, and then subjecting the separated solids to the action of centrifugal force to eliminate the greater part of any liquid adherent thereto.

36. The process of separating liquids of different specific gravities, which consists in coating the solids with a relatively light liquid, effecting their separation in a liquid body composed of a body of relatively heavy liquid, not crystallizable at the same temperature as the lighter liquid, and a body of said relatively light liquid superimposed thereon, lifting the separated solids above the level of the liquid body in which the separation is effected, permitting the two liquids to overflow at respectively different levels to maintain constant the level of each liquid used for separation, maintaining separate bodies of both liquids to receive the respective overflows, cooling the separate body of the lighter liquid to a temperature sufficient to change one of the two liquids present into crystalline form, thereby separating any particles of the two liquids that may have combined as an emulsion, continuously transferring liquid from both of the last named bodies to the main body of liquid in which separation is effected and so transferring the lighter liquid by spraying the separated solids that have been lifted above the level of the said main body of liquid, and subjecting the separated solids to the action of centrifugal force while spraying the solids with a liquid acting to dilute the liquid adhering to the solids and thereby render more certain the substantially complete elimination of the liquid that it is desired to save.

In testimony of which invention, I have hereunto set my hand, at Wilmington, Del., on this 19th day of February, 1912.

ARTHUR J. MOXHAM.

Witnesses:
CHARLES E. SPENCE,
THOMAS BURN.